US012653101B2

(12) United States Patent
Fischer et al.

(10) Patent No.: US 12,653,101 B2
(45) Date of Patent: Jun. 16, 2026

(54) COMBINE WITH A BYPASS DEVICE

(71) Applicant: CLAAS Selbstfahrende Erntemaschinen GmbH, Harsewinkel (DE)

(72) Inventors: Frédéric Fischer, Arnsberg (DE); Tim Lütke Harmann, Sendenhorst (DE); Bastian Bormann, Gütersloh (DE); Johann Witte, Fröndenberg (DE); Jonas Brandmeier, Harsewinkel (DE); Richard Geary, Marlborough (GB)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 602 days.

(21) Appl. No.: 17/985,389

(22) Filed: Nov. 11, 2022

(65) Prior Publication Data
US 2023/0144594 A1    May 11, 2023

(30) Foreign Application Priority Data
Nov. 11, 2021    (DE) ..................... 10 2021 129 368.5

(51) Int. Cl.
*A01D 41/127*    (2006.01)
*A01D 41/12*    (2006.01)

(52) U.S. Cl.
CPC ..... *A01D 41/1277* (2013.01); *A01D 41/1208* (2013.01)

(58) Field of Classification Search
CPC ............ A01D 41/1277; A01D 41/1208; A01D 41/1271; A01D 41/1276; A01D 41/1272; A01F 12/46; G01N 21/2035; G01N 21/85; G01N 2001/2007; G01N 2001/2057; G01N 2021/8592

USPC ........................................................ 460/114
See application file for complete search history.

(56) References Cited

U.S. PATENT DOCUMENTS

| | | | |
|---|---|---|---|
| 4,403,191 A | 9/1983 | Satake | |
| 5,448,069 A * | 9/1995 | Tobler | G01N 33/10 250/341.8 |
| 5,616,851 A | 4/1997 | Mcmahon et al. | |
| 6,100,526 A * | 8/2000 | Mayes | G01N 21/359 250/339.11 |
| 6,155,103 A * | 12/2000 | Diekhans | A01D 41/1277 73/863.52 |

(Continued)

FOREIGN PATENT DOCUMENTS

| | | | |
|---|---|---|---|
| DE | 4105857 A1 | 8/1992 | |
| DE | 19544057 A1 * | 5/1997 | ............. A01F 12/46 |

(Continued)

OTHER PUBLICATIONS

European Search Report for European application No. 22190473.3-1004 mailed Mar. 23, 2023.

*Primary Examiner* — Joseph M Rocca
*Assistant Examiner* — Sunny D Webb
(74) *Attorney, Agent, or Firm* — Lempia Summerfield Katz LLC

(57) ABSTRACT

A self-propelled combine for collecting and handling harvested material and a method for cleaning and/or referencing an optical measuring device of the self-propelled combine are disclosed. The self-propelled combine has a bypass device with an optical measuring device for determining harvested material properties of the partial flow of harvested material.

19 Claims, 4 Drawing Sheets

(56) References Cited

U.S. PATENT DOCUMENTS

| | | | |
|---|---|---|---|
| 6,282,967 B1 | 9/2001 | Homburg et al. | |
| 6,285,198 B1 * | 9/2001 | Nelson | A01D 41/1277 |
| | | | 73/335.04 |
| 6,327,899 B1 | 12/2001 | Diekhans et al. | |
| 6,483,583 B1 | 11/2002 | Wright et al. | |
| 6,559,655 B1 | 5/2003 | Rosenthal | |
| 6,686,749 B2 * | 2/2004 | Rains | A01D 41/1208 |
| | | | 324/689 |
| 6,791,683 B2 * | 9/2004 | Sjodin | G01N 21/3563 |
| | | | 356/244 |
| 6,845,326 B1 | 1/2005 | Panigrahi et al. | |
| 8,337,283 B2 | 12/2012 | Kormann et al. | |
| 9,964,484 B2 | 5/2018 | Haiges et al. | |
| 10,188,036 B2 * | 1/2019 | Loukili | G06V 20/56 |
| 11,160,208 B2 * | 11/2021 | Temple | G01N 25/56 |
| 11,197,417 B2 * | 12/2021 | Corban | H04N 23/57 |
| 11,589,510 B2 * | 2/2023 | Shinners | A01F 29/04 |
| 2002/0133309 A1 | 9/2002 | Hardt | |
| 2009/0074243 A1 | 3/2009 | Missotten et al. | |
| 2009/0258684 A1 | 10/2009 | Missotten | |
| 2009/0291723 A1 | 11/2009 | Missotten | |
| 2011/0086684 A1 | 4/2011 | Luellen | |
| 2011/0151952 A1 | 6/2011 | Kormann et al. | |
| 2012/0004815 A1 | 1/2012 | Behnke | |
| 2012/0218403 A1 | 8/2012 | Beaty | |
| 2013/0000393 A1 | 1/2013 | Cash | |
| 2017/0112056 A1 | 4/2017 | Sierra | |
| 2017/0112057 A1 | 4/2017 | Loukili et al. | |
| 2018/0000011 A1 | 1/2018 | Schleusner | |
| 2021/0298235 A1 | 9/2021 | Beulke et al. | |
| 2022/0000006 A1 | 1/2022 | Wieckhorst et al. | |
| 2022/0057322 A1 | 2/2022 | Fischer et al. | |
| 2022/0132736 A1 | 5/2022 | Meyers et al. | |
| 2022/0375115 A1 | 11/2022 | Missotten et al. | |
| 2024/0365706 A1 * | 11/2024 | Pflederer | A01D 61/00 |

FOREIGN PATENT DOCUMENTS

| | | | | |
|---|---|---|---|---|
| DE | 19744481 A1 * | 4/1999 | | G01N 22/04 |
| DE | 102010062417 A1 | 6/2011 | | |
| EP | 2036424 A2 | 3/2009 | | |
| EP | 2168419 A1 * | 3/2010 | | A01D 41/1277 |
| EP | 2401906 A1 | 1/2012 | | |

* cited by examiner

COMBINE WITH A BYPASS DEVICE

REFERENCE TO RELATED APPLICATION

This application claims priority under 35 U.S.C. § 119 to German Patent Application No. 10 2021 129 368.5 filed Nov. 11, 2021, the entire disclosure of which is hereby incorporated by reference herein.

TECHNICAL FIELD

The present invention relates to a self-propelled combine and a method of controlling the combine.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Self-propelled combines typically have a grain elevator for conveying a flow of harvested material from a conveying and cleaning device of the combine to a grain tank of the combine. U.S. Pat. Nos. 6,155,103 and 6,327,899, both of which are incorporated by reference herein in their entirety, disclose, for example, a bypass device arranged or positioned on the grain elevator, through which a partial flow of harvested material of the harvested material flow guided through the grain elevator is guided, with the bypass device having a moisture sensor for measuring moisture.

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

Figure 1:
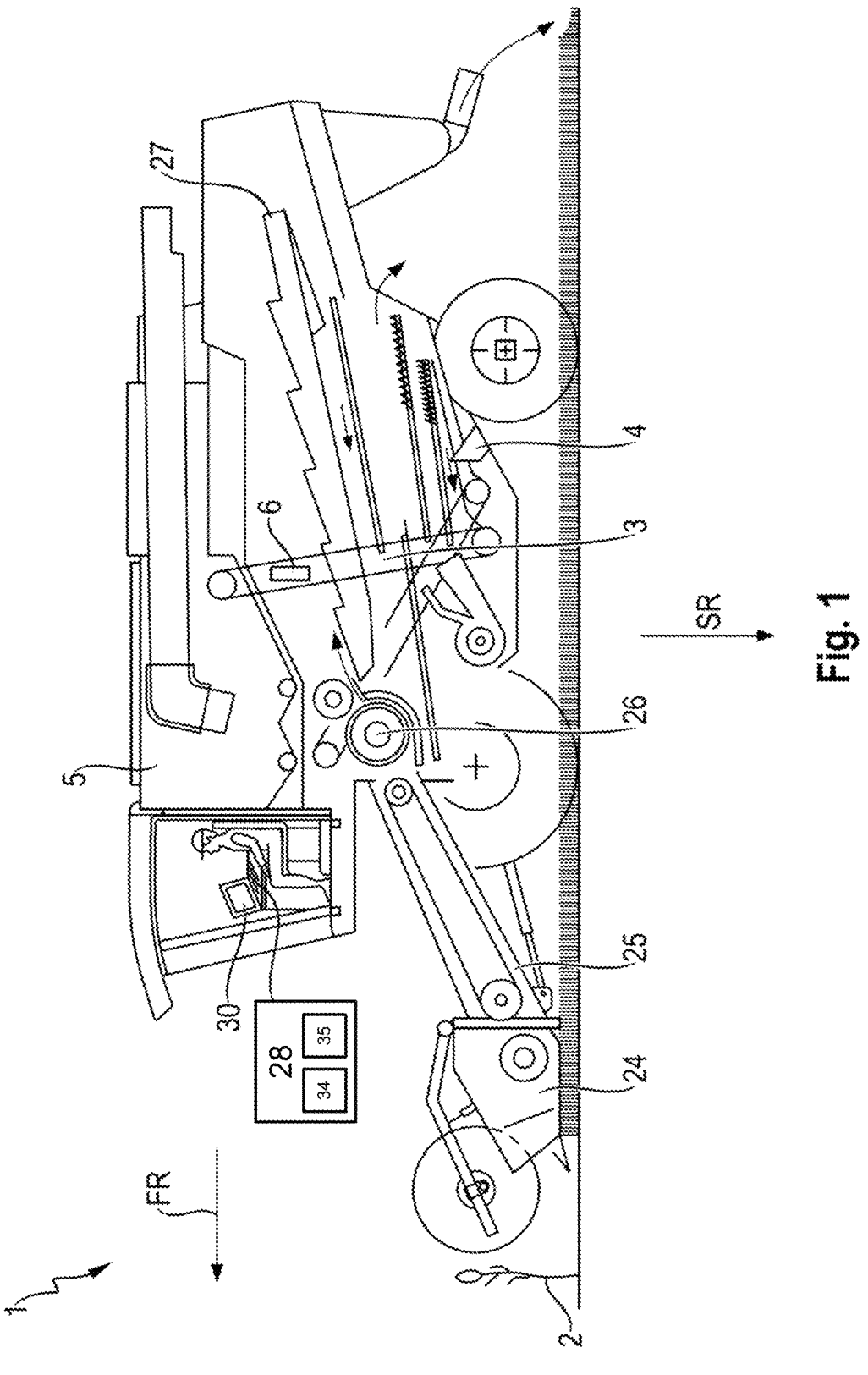
FIG. 1 illustrates a self-propelled combine.

As discussed in the background, self-propelled combines may have a grain elevator for conveying a flow of harvested material. One aspect of the present invention is to provide an improved or an alternative a self-propelled combine having a bypass device.

The self-propelled combine according to one aspect of the invention is configured for picking up (or collecting) and handling harvested material. The combine comprises a grain elevator configured to convey a flow of harvested material from a conveying and/or cleaning device of the combine to a grain tank of the combine. In so doing, a bypass device may be arranged or positioned at the grain elevator in such a way that at least a part of the flow (e.g., a partial flow of harvested material) of the harvested material guided through the grain elevator flows into the bypass device. The bypass device is configured to guide the partial flow of harvested material. The partial flow of harvested material may flow from the grain elevator into the bypass device and then flow through it, wherein the partial flow of harvested material may then flow back into the grain elevator after flowing through the bypass device.

In one or some embodiments, the bypass device includes an optical measuring device configured to determine one or more harvested material properties, such as one or more constituents, of the partial flow of harvested material. In this regard, the optical measuring device may be designed for determining the one or more constituents of the partial flow of harvested material.

In one or some embodiments, a measuring device may be used to determine the one or more harvested material properties. In a specific embodiment, the measuring device comprises an optical measuring device which may, for example, be configured to determine any one, any combination, or all of: the water mass; the protein mass; the carbohydrate mass; the fat mass; or the oil mass of the partial flow of harvested material. For this purpose, in one or some embodiments, the optical measuring device may have a light source which illuminates at least a part of the partial flow of harvested material as the partial flow of harvested material flows through the optical measuring device.

Furthermore, the optical measuring device may be configured to detect mass-proportional absorption spectra using at least one sensor, such as one or both of a near-infrared sensor or a silicon detector, which may be configured to generate measurement data (e.g., absorption spectral, such as mass-proportional absorption spectra). In turn, the optical measuring device may be configured to determine any one, any combination, or all of: the water mass; the protein mass; the carbohydrate mass; the fat mass; or the oil mass of the partial flow of harvested material based on the measurement data. In this way, the optical measuring device may be configured to determine one or both of the composition of the ingredients or the properties of the flow of harvested material guided through the grain elevator based on the mass-proportional absorption spectra of the partial flow of harvested material.

In one or some embodiments, the bypass device has a screw conveyor configured to convey the partial flow of harvested material to the optical measuring device. The bypass device may have a feed opening through which the partial flow of harvested material flows into the bypass device starting from the grain elevator. In so doing, the partial flow of harvested material may flow into the screw conveyor. For this purpose, a feed opening may be arranged or positioned above part of the screw conveyor so that the partial flow of harvested material at least partly flows (such as substantially flows) along the direction of gravity under the force of gravity, and flows into the screw conveyor through an inflow opening.

In one or some embodiments, the screw conveyor is configured to convey the fed partial flow of harvested material to the optical measuring device. In this case, the screw conveyor may be designed and/or aligned in the bypass device in such a way that the partial flow of harvested material conveyed through the screw conveyor leaves via an outflow opening and flows in the direction of the optical measuring device. In this case, the inflow opening may be arranged or positioned below the outflow opening with respect to the direction of gravity. In other words, the partial flow of harvested material in the screw conveyor may be conveyed upwards. By using the screw conveyor, a continuous and uniform supply of the partial flow of harvested material to the optical measuring device may result so that the optical measuring device may perform optimal measurements. The conveyance of the inflowing partial flow of harvested material within the screw conveyor may occur along a main conveying direction.

In one or some embodiments, the screw conveyor may have an intermediate opening formed downstream from the discharge opening with respect to the main conveying direction, wherein part of the partial flow of harvested material which has not flowed into the discharge opening may flow back into the grain elevator via this intermediate opening.

In one or some embodiments, the screw conveyor may have a drive, such as any one, any combination, or all of: a hydraulic drive; an electric drive; or a mechanical drive.

In one or some embodiments, the bypass device has a feed tube configured to guide the partial flow of harvested material from the screw conveyor to the optical measuring device, wherein the optical measuring device has a tube, such as a transparent tube and/or an optically transparent tube, for guiding the partial stream of the flow of harvested material for determining harvested material properties of the partial flow of harvested material. The tube may be a glass tube, such as any one, any combination, or all of a transparent glass tube; an optically transparent glass tube; or a wooden tube (e.g., a transparent wooden tube and/or an optically transparent wooden tube). Glass may be a non-crystalline solid, such as a transparent amorphous solid. The feed tube may be formed separately with respect to the screw conveyor and/or separately with respect to the optical measuring device. In terms of flow, the feed tube may be arranged or positioned between the screw conveyor and the optical measuring device in such a way that the partial flow of harvested material from the screw conveyor first flows into the feed tube, then flows through the feed tube, and thereafter flows into the optical measuring device. The region of the screw conveyor from which the partial flow of harvested material exits may be arranged or positioned above the feed tube so that the partial flow of harvested material, in addition to the speed of the screw conveyor, also flows under gravity substantially along the direction of gravity.

In one or some embodiments, the tube of the optical measurement device may be substantially transparent to light radiation from the optical measurement device light source, and/or substantially transparent to radiation detected and/or measured by the optical measurement device sensor.

In one or some embodiments, the bypass device is configured to clean the tube of the optical measuring device and/or to ensure an empty state of the tube of the optical measuring device. In one or some embodiments, the bypass device is configured to perform a cleaning of the tube before ensuring the empty state of the tube.

The optical measuring device may be designed in such a way that it may detect and/or determine, such as detect and/or determine by sensor(s), that the optical measuring device should be cleaned and/or referenced. For this purpose, in one or some embodiments, the sensor(s) of the optical measuring device may independently determine two different references without the white standard being introduced into the optical measuring device. These two different references may comprise a "dark reference" and a "white reference". With the "dark reference", the light source of the optical measuring device is turned off, and there is no harvested material in the optical measuring device. With the "white reference", the light source of the optical measuring device is on, and there is no harvested material in the optical measuring device. Based on these two references, a changed characteristic of the light source, which may be caused by aging, may be eliminated, calculated out, or its effect reduced, or a slight fouling of a glass bulb in the optical measuring device may be eliminated, calculated out, or its effect reduced. Merely by way of example, when referencing or calibrating, such as re-calibrating the optical measuring device, the partial flow of harvested material may be prevented from flowing through the tube at which the sensor senses. After preventing the flow, the sensor may generate a sensor reading, which may then be used to calibrate or be used as a zero reference (at which there is no partial flow of harvested material) so as to offset or modify the sensor readings that are generated when there is a partial flow of harvested material. Therefore, when the light source ages and/or the glass bulb becomes slightly dirty, the optical measuring device may still be used and/or utilized with sufficient reliability. For such referencing of the optical measuring device, the bypass device may ensure that the tube is in an empty state or a substantially empty state (e.g., 90% empty; 95% empty; 98% empty; 99% empty). In one or some embodiments, for sufficient or adequate referencing, such as good referencing, a reference measurement may be performed at regular intervals.

Furthermore, in certain harvesting conditions, it may be necessary to clean the tube. This may be performed with a cylinder, the piston rod of which may be pushed through the tube. For this purpose, a cleaning element may be arranged or positioned on the piston rod. In particular, the cleaning element may be arranged or positioned at the end of the piston rod. In one or some embodiments, the cleaning element may be designed as a brush-like attachment. A brush-like attachment may be designed like any one, any combination, or all of: a broom; a wire brush; or a "pipe cleaner".

The optical measuring device may be designed to detect that there is a blockage of the tube which cannot be removed by the optical measuring device, but may need to be removed manually. In such a case, the optical measuring device may, for example, notify the operator of the combine regarding the blockage and/or request the operator of the combine to manually remove the blockage of the tube (e.g., generate a visual and/or aural output on a display mounted in a cabin of the combine).

In order to ensure the empty state or substantially empty state of the tube, the screw conveyor may perform a reverse rotation of its screw, such as for a short period of time, in order to block the entry of the partial flow of harvested material into the tube.

In one or some embodiments, in order to ensure the empty state or substantially empty state of the tube, the bypass device may have a first cylinder with a movable piston rod and, for cleaning the tube, a second cylinder with a movable piston rod, wherein the first cylinder may be designed separately from the second cylinder.

In one or some embodiments, the bypass device may include an additional sample inlet and an additional sample outlet to measure a grain sample that has not been harvested by the combine. In this regard, it may be provided that the bypass device ensures that the tube of the optical measuring device is empty, so that no partial flow of harvested material harvested by the combine may flow into the tube, but the grain sample may be introduced into the tube via the additional sample inlet. It may be provided that the bypass device performs a cleaning of the tube before ensuring the empty state of the tube. For this purpose, the additional sample inlet may be arranged or positioned above the tube of the optical measuring device so that the grain sample flows substantially along the direction of gravity under the force of gravity and passes through the tube. Subsequently, the grain sample may flow out of the optical measuring device via the additional sample outlet, wherein the additional sample outlet is arranged or positioned below the tube of the optical measuring device so that the grain sample flows substantially along the direction of gravity under the force of gravity and exits the tube. Since no active conveyance of material is required in so doing, it may be unnecessary, for example, for the drive and/or screw conveyor of the combine to be active. This system may be used to measure a sample or grain sample with known contents in order to perform an offset correction of the sensor of the optical measuring device (e.g., the sensor may generate sensor data of the known contents; the sensor data generated by the sensor of the known contents may be compared with the ideal sensor data (if the sensor were operating without error); the comparison may then be used to perform the offset correction for subsequent sensor data generated by the sensor).

By using a bypass device designed to clean the tube of the optical measuring device and to ensure that the tube of the optical measuring device is empty or substantially empty, the operating time of the optical measuring device may be maximized so that, for example, maintenance costs and/or spare parts costs may be reduced.

In one or some embodiments, the bypass device includes a cylinder device with a movable piston rod for cleaning the tube of the optical measuring device and for ensuring an empty state (or a substantially empty state) of the tube of the optical measuring device. In other words, the bypass device may have only or exactly one cylinder device that is designed for cleaning the tube and ensuring an empty state of the tube. The bypass device, such as the arrangement and/or orientation of the optical measuring device (e.g., any one, any combination, or all of the tube; the screw conveyor; and the one cylinder device) may be designed such that the one cylinder device is designed to clean the tube of the optical measuring device and to ensure an empty state (or a substantially empty state) of the tube of the optical measuring device. In this regard, the cleaning of the tube of the optical measuring device and the ensuring an empty state of the tube need not occur simultaneously. Rather, in one embodiment, the tube is first cleaned and then an empty state (or substantially empty state) of the tube is ensured. In one or some embodiments, the one cylinder device only ensures that the tube is empty or only that the tube is cleaned.

In one or some embodiments, since only one cylinder device and no other one cylinder is required, the manufacturing costs of the bypass device may be reduced, the required installation space for the bypass device may be reduced and the overall weight of the bypass device may be optimized.

In one or some embodiments, at least a part of the piston rod, such as an end face of the piston rod, may assume at least one opening position in which the screw conveyor, the feed tube and the tube are connected to each other for guiding the partial flow of harvested material in such a way that a partial flow of harvested material conveyed by the screw conveyor substantially flows into the feed tube and subsequently flows through the tube. In other words, the piston rod may assume one or more open positions in which the flow of the partial flow of harvested material is not affected or attenuated by the piston rod. In such a case, the piston rod is arranged or positioned outside a flow path leading from the screw conveyor to the feed tube.

Alternatively or additionally, it is provided that the piston rod, such as the end face of the piston rod, may assume at least one intermediate position in which at least a part of the piston rod suppresses the partial flow of harvested material from the screw conveyor to the tube, so that a partial flow of harvested material originating from the screw conveyor does not flow into the tube of the optical measuring device. In other words, the piston rod may adopt one or more intermediate positions in which the partial flow of harvested material starting from the screw conveyor cannot flow into the tube of the optical measuring device. Therefore, at least a part of the piston rod, such as a cleaning element, may seal the tube with respect to the screw conveyor. The intermediate position of the piston rod, such as the end face of the piston rod, may be a position within the feed tube.

In this regard, at least a part of the piston rod may at least partially pass through the screw conveyor so that, in such an embodiment, the screw conveyor may stop conveying and, for example, the position of the screw turns may be aligned such that the piston rod may be moved without friction between the screw turns of the screw conveyor.

In this case, the piston rod need not pass through the screw conveyor so that, at each intermediate position of the piston rod, the screw conveyor may continue to convey, but the partial flow of harvested material cannot flow into the tube. In this case, the partial flow of harvested material may flow back into the grain elevator via the intermediate opening, for example. However, even in this case, it may be provided that the screw conveyor stops conveying even though the piston rod does not negatively affect the basic operation of the screw conveyor.

Alternatively or additionally, at least a part of the piston rod, such as the end face of the piston rod, may assume at least one end position in which at least a part of the piston rod is arranged or positioned in an end opening of the tube of the optical measuring device. Cleaning and/or draining or emptying of the tube may thereby be performed. The end opening of the tube may be the opening of the tube from which the crop partial stream flows out.

In one or some embodiments, the piston rod has a cleaning element, such as a brush-like cleaning element. In particular, the cleaning element may be arranged or positioned at the end of the piston rod. For example, the cleaning element may be designed as a brush-like attachment. A brush-like attachment may be formed like any one, any combination, or all of a broom; a wire brush; a "tube cleaner"; or a sponge. The cleaning element may be formed starting from the end face of the piston rod. Cleaning of the tube may be optimally performed with the cleaning element so that the service life of the optical measuring device may be increased, and/or the measuring accuracy may be improved or optimized.

In one or some embodiments, the bypass device has a displacement measuring device for determining the position of the piston rod, such as the end face and/or the cleaning element, in order to enable precise positioning of at least a part of the piston rod (e.g., the end face and/or the cleaning element). In particular, the displacement measuring device may be used to guide at least a part of the piston rod, such as the end face and/or the cleaning element, specifically to an intermediate position so that the partial flow of harvested material conveyed by the screw conveyor does not flow into the tube of the optical measuring device.

Alternatively or additionally, the bypass device may comprise a device for time-controlled position change of at least a part of the piston rod, such as the end face and/or of the cleaning element, in order to enable precise positioning of the at least a part of the piston rod (e.g., the end face and/or the cleaning element). In particular, the time-controlled change in position may be used to guide the piston rod, such as as the end face and/or the cleaning element, specifically to an intermediate position so that the partial flow of harvested material conveyed by the screw conveyor does not flow into the tube of the optical measuring device.

Alternatively or additionally, the bypass device may have a sensor and/or a switch in the feed tube that is configured to detect the presence of at least a part of the piston rod, such as the end face and/or the cleaning element, in order to enable an accurate positioning of the piston rod, such as the end face and/or the cleaning element. The sensor and/or the switch may be positioned in the feed tube. In one or some embodiments, the switch may be a proximity switch. In one or some embodiments, the sensor may be an inductance sensor. For example, the piston rod may move in the direction of the optical measuring device, wherein this movement is stopped when the sensor and/or the switch detects the piston rod (e.g., a controller may receive sensor and/or switch data; the controller may analyze the sensor and/or switch data to determine whether the piston rod has been detected (such as analyze whether the sensor or switch data is indicative of detecting the piston rod); responsive to the controller detecting the piston rod, the controller may control the movement of the piston rod to stop). In this regard, based on this detection, the movement of the piston rod is stopped.

In one or some embodiments, the optical measuring device is configured to determine the position of at least a part of the piston rod, such as the end face and/or the cleaning element, within the tube, in order to enable precise positioning of the piston rod, such as the end face and/or the cleaning element. Based on the absorption spectrum generated by the piston rod, such as the end face and/or the cleaning element, the optical measuring device may detect whether a part of the piston rod, such as the end face and/or the cleaning element, is located within the tube. After this detection, the piston rod may be moved out of the tube until the piston rod, such as the end face and/or the cleaning element, is no longer in the tube (e.g., a controller may receive absorption spectrum data; the controller may analyze the absorption spectrum data to determine whether a part of the piston rod is located within the tube; responsive to the controller determining that at least a part of the piston rod is located within the tube, the controller may control the movement of the piston rod to withdraw from the tube). The fact that the piston rod, such as the end face and/or the cleaning element, is no longer in the tube may again be detected by the optical measuring device from the generated absorption spectrum and then stops, such as immediately and/or instantaneously, the extension movement of the piston rod. Due to the arrangement of the tube, the feed tube and the screw conveyor, the piston rod, such as the end face and/or the cleaning element, may remain in the feed tube so that the partial flow of harvested material cannot flow from the screw conveyor into the tube. In other words, at least a part of the piston rod, such as the end face and/or the cleaning element, may seal the tube with respect to the screw conveyor.

In one or some embodiments, the optical measuring device is configured to determine the position of the piston rod, such as the end face and/or the cleaning element, using at least one absorption spectrum. In this way, the position of the piston rod, such as of the end face and/or the cleaning element, may be determined within the optical measuring device, such as within the tube.

In one or some embodiments, at least a part of the piston rod, such as the end face and/or the cleaning element, has a geometric variation at least in sections. In this way, the piston rod may be designed in such a way that a specific absorption behavior may be assigned to a specific cylinder stroke. A geometric variation may comprise a geometric change of the material. For example, in addition to a circular cross-section of the piston rod, a triangular cross-section of the piston rod may be formed.

Alternatively or additionally, at least a part of the piston rod, such as the end face and/or the cleaning element, may be formed at least sectionally from different materials. Different materials may have different absorption characteristics. This may also be used for additional, such as more precise multi-point calibration of the sensor.

In one or some embodiments, the bypass device has a feed opening through which the partial flow of harvested material from the grain elevator may flow into the bypass device.

Alternatively or additionally, the bypass device has an outlet opening through which the partial flow of harvested material may flow into the grain elevator after flowing through the optical measuring device.

Alternatively or additionally, the bypass device has an intermediate opening through which the partial flow of harvested material may flow into the grain elevator.

In one or some embodiments, a collecting container for collecting the partial flow of harvested material is formed between the feed opening and the screw conveyor. The collecting container may have a taper in the direction of the screw conveyor, such as a cross-sectional taper. Through the collecting container, the quantity of the partial flow of harvested material may be guided with reduced fluctuations to the screw conveyor and consequently with reduced fluctuations to the optical measuring device.

Furthermore, one aspect of the invention relates to a method for cleaning and/or referencing the optical measuring device of the self-propelled combine according to the invention. The optical measuring device may determine whether cleaning and/or referencing is warranted. Responsive to determining that cleaning and/or referencing is warranted, the optical measuring device may transmit a cleaning data signal and/or a referencing data signal to the self-propelled combine, such as to a control unit of the combine, if cleaning and/or referencing of the optical measuring device is warranted. Responsive to receiving the cleaning signal and/or the referencing signal, the self-propelled combine, such as the control unit of the combine, performs a cleaning of the optical measuring device using the bypass device and/or enables a referencing of the optical measuring device by preventing the inflow of the partial flow of harvested material into the optical measuring device.

In one or some embodiments, the self-propelled combine, responsive to detecting the cleaning signal, controls the piston rod in such a way that the piston rod moves into the end position in order to effect cleaning of the optical measuring device, in particular of the tube.

Alternatively or additionally, the self-propelled combine, responsive to detecting the referencing signal, controls the piston rod in such a way that the piston rod is positioned in an intermediate position so that the partial flow of harvested material cannot flow into the tube of the optical measuring device.

It is understood that the aforementioned features and those to be explained below are usable not only in the combination indicated in each case, but also in other combinations or on their own, without departing from the scope of the present invention.

Referring to the figures, FIG. 1 shows a self-propelled combine 1 for picking up and handling harvested material 2. An example of a self-propelled combine 1 is disclosed in US Patent Application Publication No. 2021/0298235 A1, incorporated by reference herein in its entirety. The self-propelled combine may include a computer unit 28 having a display screen 30 for an operator of the self-propelled combine 1.

The computer unit 28 may include any type of computing functionality, such as at least one processor 34 (which may comprise a microprocessor, controller, PLA, or the like) and at least one memory 35. The memory 35 may comprise any type of storage device (e.g., any type of memory). Though the processor 34 and the memory 35 are depicted as separate elements, they may be part of a single machine, which includes a microprocessor (or other type of controller) and a memory. Alternatively, the processor 34 may rely on memory 35 for all of its memory needs.

The processor 34 and memory 35 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

When the self-propelled combine 1 is operating, the combine 1 travels in a direction of travel FR through the crop 2 while picking up the crop 2 with a cutting unit 24. An inclined conveyor 25 conveys this harvested material 2 to the threshing unit 26. In the threshing unit 26, a separator 27 and a conveying and cleaning device 4 may be configured to separate the grains from the rest of the harvested material so that a flow of harvested material is formed.

The combine 1 may include a grain elevator 3 configured to convey a flow of harvested material from the conveying and cleaning device 4 to a grain tank 5 of the combine 1. In so doing, a bypass device 6 is arranged or positioned at the grain elevator 3 in such a way that a partial flow of harvested material of the flow of harvested material guided through the grain elevator 3 may flow into the bypass device 6. The partial flow of harvested material may thus flow from the grain elevator 3 into the bypass device 6, and subsequently the partial flow of harvested material may flow through the bypass device 6. After which, the partial flow of harvested material may flow back into the grain elevator 3 after flowing through the bypass device 6. Other flows into and/or out of the bypass device 6 are contemplated.

Figure 2:
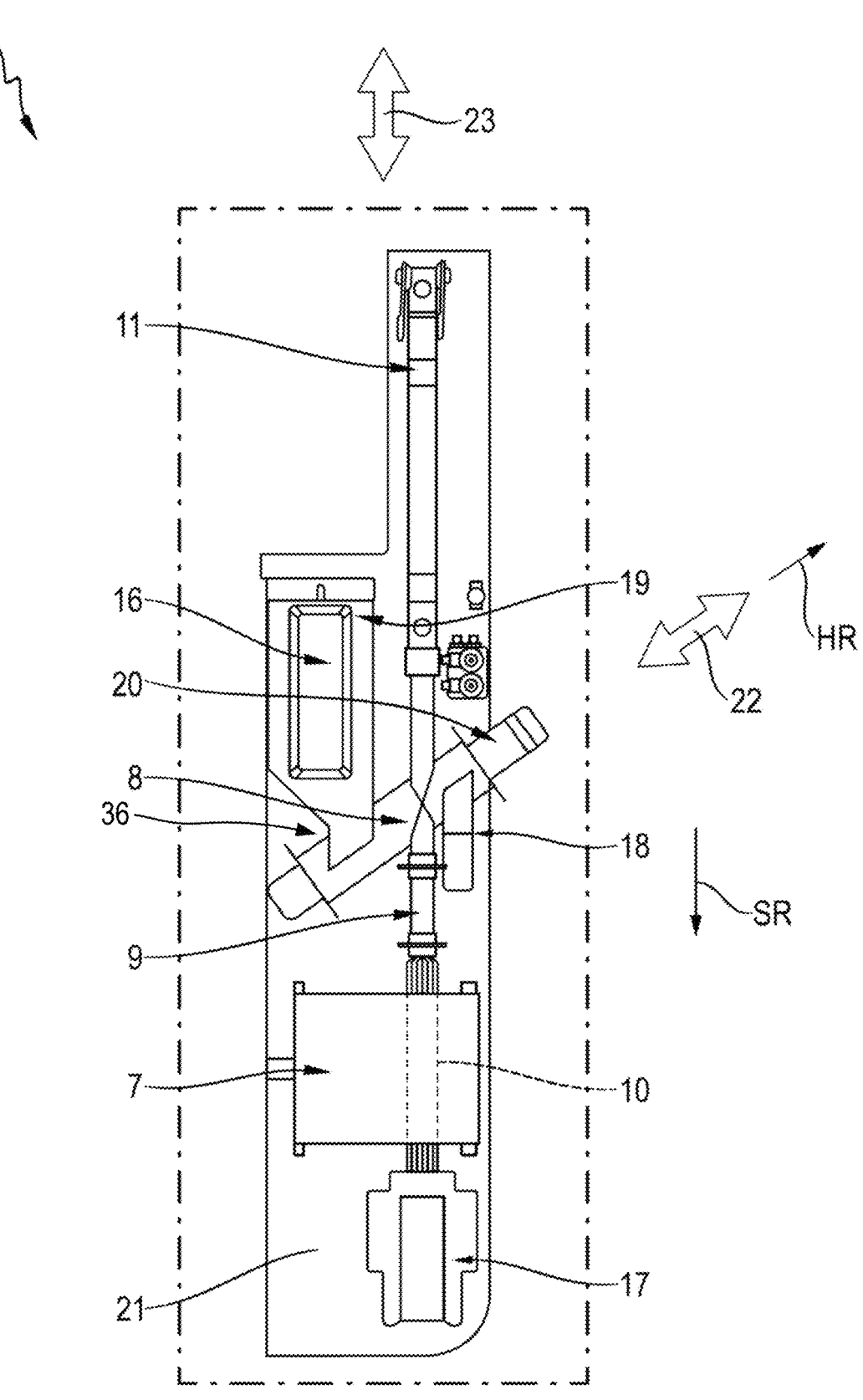
FIG. 2 illustrates a front view of a bypass device.
Figure 3:
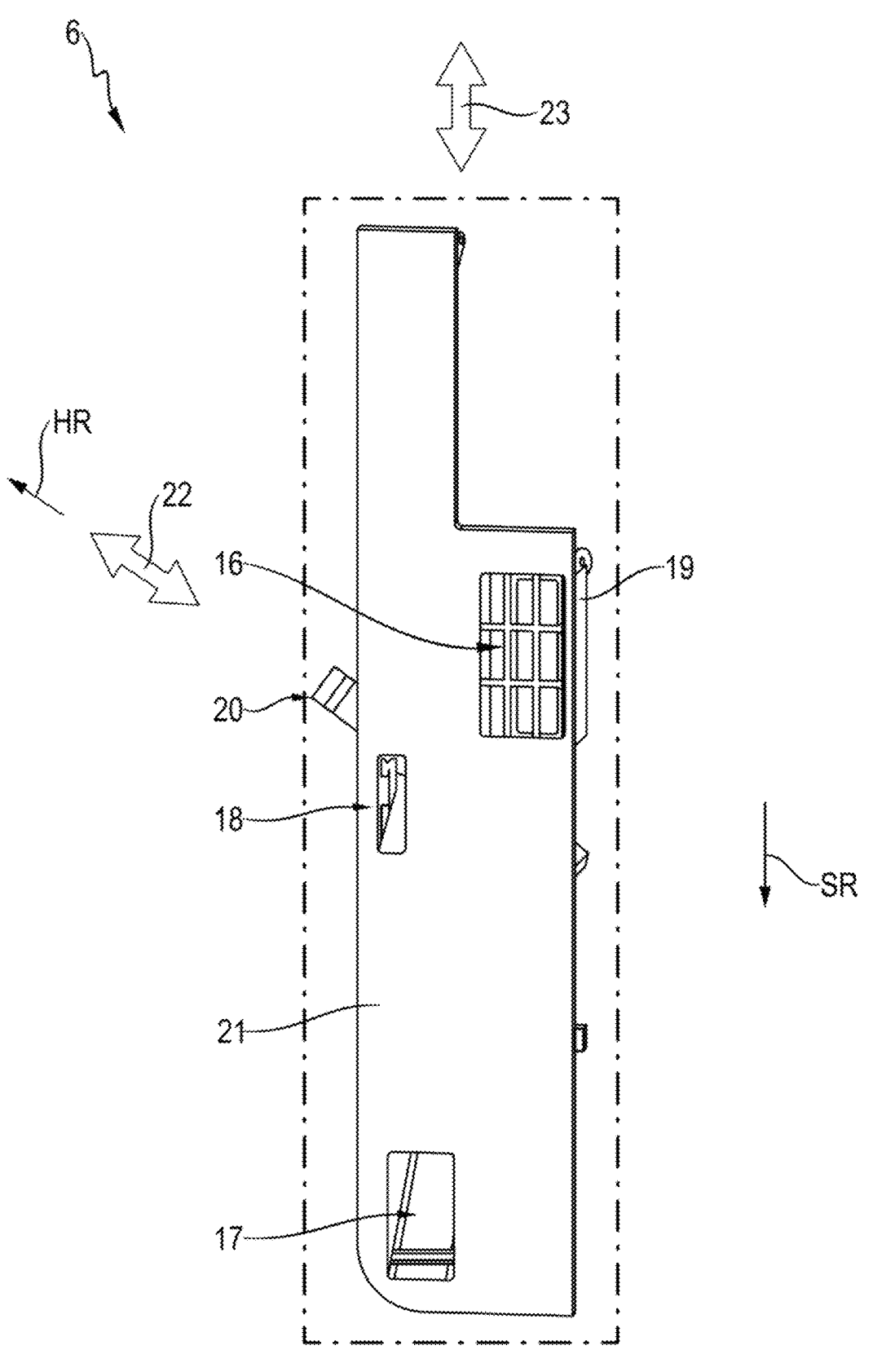
FIG. 3 illustrates a rear view of the bypass device.
Figure 4:
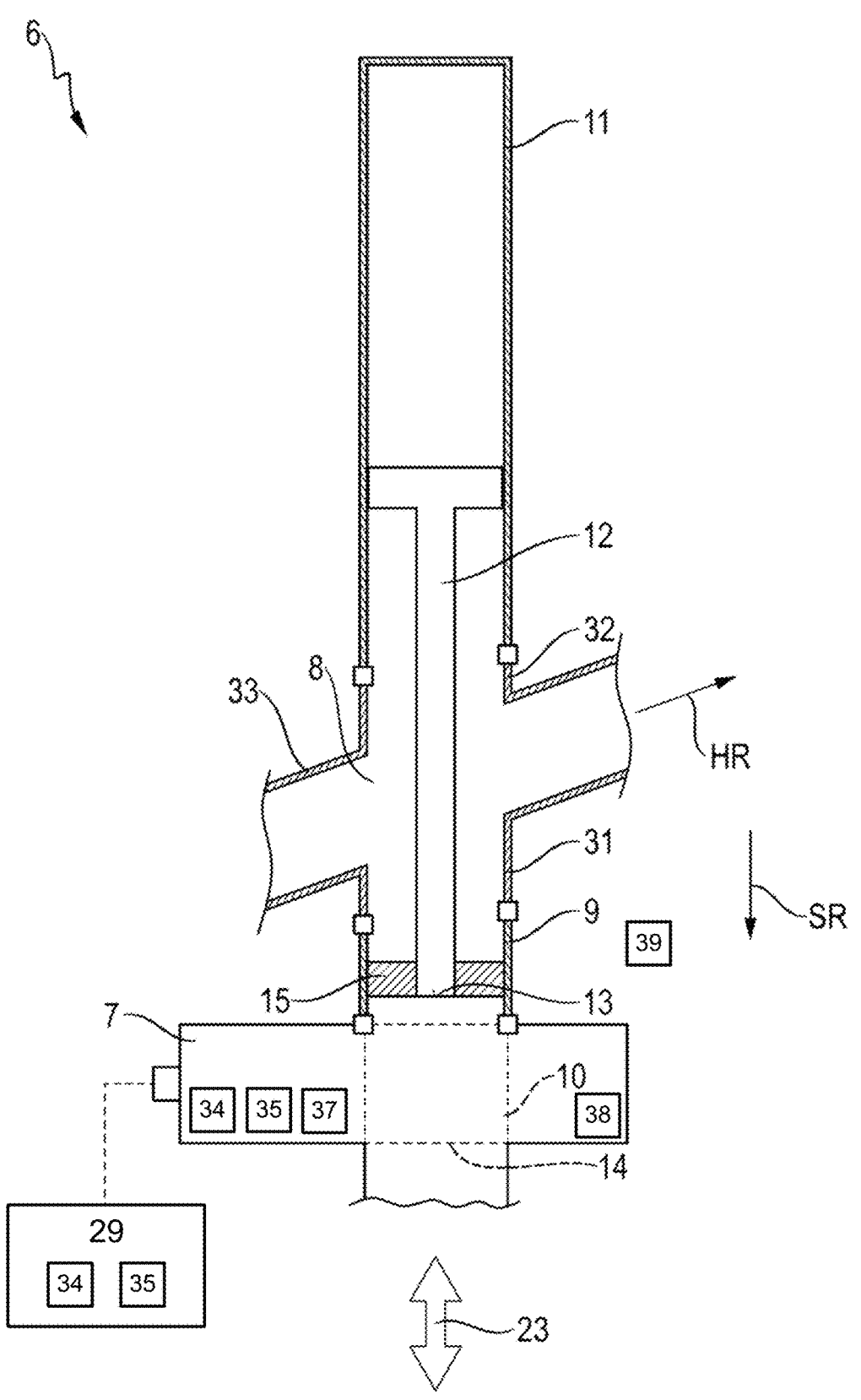
FIG. 4 illustrates a schematic front view of the bypass device in which a piston rod is visible.

FIG. 2 shows a front view of a bypass device 6, and FIG. 3 shows a rear view of the bypass device 6. FIG. 4 shows a schematic front view of a partial area of the bypass device 6, wherein a piston rod 12 is visibly shown.

The components of the bypass device 6 may be arranged or positioned and/or fixed on a base plate 21 of the bypass device 6. In one or some embodiments, the base plate 21 of the bypass device 6 has a feed opening 16 through which the partial flow of harvested material flows into the bypass device 6 starting from the grain elevator 3. In one or some embodiments, the bypass device 6 has a screw conveyor 8 and a collecting container 19, wherein the collecting container 19 is formed and/or arranged or positioned between the feed opening 16 and the screw conveyor 8 in such a way that the partial flow of harvested material flows from the feed opening 16 into the collecting container 19 and subsequently flows from the collecting container 19 into the screw conveyor 8. For this purpose, the feed opening 16 may be arranged or positioned above a part of the screw conveyor 8 so that the partial flow of harvested material flows substantially along the direction of gravity SR under the force of gravity and flows into the screw conveyor via an inflow opening (shown generally at arrow 36).

In one or some embodiments, the screw conveyor 8 is designed to convey the partial flow of harvested material to an optical measuring device 7 of the bypass device 6. In one or some embodiments, the screw conveyor 8 has a tubular body 33 extending along the conveying direction 22. Further, the screw conveyor 8 may have a drive 20, which may be configured to drive screw windings rotatably mounted in the tubular body 33 and not shown. By the rotational movement of the screw windings, the partial flow of harvested material that has entered in the screw conveyor 8 is transported in the direction of the main conveying direction HR in order to supply the optical measuring device 7 with the partial flow of harvested material. For this purpose, the tubular body 33 may have a first transverse tube 31, wherein the tubular body 33 and the transverse tube 31 may in one embodiment be formed as one piece. A feed tube 9 for guiding the partial flow of harvested material from the screw conveyor 8 to the optical measuring device 7 may be arranged or positioned on the transverse tube 31 which has an outflow opening. In one or some embodiments, the optical measuring device 7 has a tube 10 for guiding the partial flow of harvested material, so that the determination and/or measurement of harvested material properties of the partial flow of harvested material may be performed.

The optical measuring device 7 may include computational functionality, one example of which is at least one processor 34 and at least one memory 35. The computing functionality of the optical measuring device 7 may be used, for example, to determine any one, any combination, or all of: the water mass; the protein mass; the carbohydrate mass; the fat mass; or the oil mass of the partial flow of harvested material. For this purpose, the optical measuring device 7 has a light source 37 which illuminates the partial flow of harvested material as it flows through the optical measuring device 7. In one or some embodiments, the optical measuring device 7 includes one or more sensors 38 that is configured to detect mass-proportional absorption spectra (which is one example of measurement data). The optical measuring device 7 is further configured to determine one or more aspects of the partial flow of harvested material (e.g., any one, any combination, or all of: the water mass; the protein mass; the carbohydrate mass; the fat mass; or the oil mass of the partial flow of harvested material) with reference to these measurement data.

In one or some embodiments, the bypass device 6 is configured to clean the tube 10 of the optical measuring device 7 and to ensure an empty state (or a substantially empty state) of the tube 10 of the optical measuring device 7, wherein the bypass device 6 may have a single cylinder device 11 for this purpose with a movable piston rod 12 for cleaning the tube 10 of the optical measuring device 7 (e.g., using motor 39 to move piston rod), and for ensuring an empty state (or a substantially empty state) of the tube 10 of the optical measuring device 7. The piston rod 12 may be moved along the direction of movement 23. In this embodiment, the direction of movement 23 of the piston rod 12 need not be aligned perpendicularly to the conveying direction 22 of the screw conveyor so that the piston rod 12 may be guided at least partially through the tubular body 33 and/or positioned at least partially in the tubular body 33. For this purpose, the tubular body 33 may have a second transverse tube 32. In one or some embodiments, the tubular body 33 and the second transverse tube 32 are formed as one piece. The first transverse tube 31 and the second transverse tube 32 may be positioned on the tubular body 33 such that the piston rod 12 may move from the first transverse tube 31 to the second transverse tube 32, or vice versa. In this regard, it is contemplated that the screw conveyor 8 stops convey- ing, and, for example, the position of the screw windings (not shown) is aligned such that the piston rod 12 may be moved without friction between the screw windings of the screw conveyor 8.

At least a part of the piston rod 12, such as an end face 13 of the piston rod 12, may assume at least one opening position in which the screw conveyor 8, the feed tube 9 and the tube 10 are connected to each other for guiding the partial flow of harvested material in such a way that a partial flow of harvested material conveyed by the screw conveyor 8 substantially flows into the feed tube 9 and subsequently flows through the tube 10.

In one or some embodiments, the screw conveyor 8 may have an intermediate opening 18 formed downstream from the discharge opening with respect to the main conveying direction HR, wherein part of the partial flow of harvested material which has not flowed into the discharge opening may flow back into the grain elevator 3 via this intermediate opening 18.

The piston rod 12, in particular the end face 13 of the piston rod 12, may assume at least one intermediate position in which at least a part of the piston rod 12 suppresses the partial flow of harvested material from the screw conveyor 8 to the tube 10, so that a partial flow of harvested material originating from the screw conveyor 8 does not flow into the tube 10 of the optical measuring device 7. This situation is illustrated in FIG. 4. For this purpose, the piston rod 12 may have, for example, a cleaning element 15, such as a brush- like cleaning element 15.

At least a part of the piston rod 12, such as the end face 13 of the piston rod 12, may assume at least one end position in which at least a part of the piston rod 12 is arranged or positioned in an end opening 14 of the tube 10 of the optical measuring device 7. The bypass device 6 has an outlet opening 17 through which the partial flow of harvested material may flow into the grain elevator 3 after flowing through the optical measuring device 7.

As shown in FIG. 3, the feed opening 16, the outlet opening 17 and the intermediate opening 18 may each form and/or has an opening and/or hole in the base plate 21.

In one or some embodiments, the optical measuring device 7 is configured to determine whether cleaning and/or referencing is required or warranted. Responsive to the optical measuring device 7 determining that cleaning and/or reference are required or warranted, the optical measuring device 7 may transmit a cleaning data signal (responsive to determining to clean) and/or a referencing data signal (re- sponsive to determining to reference) to the self-propelled combine 1, such as to a control unit 29 of the combine 1. In one embodiment, control unit 29 resides within computing unit 28 (e.g., control unit 29 using the same processor 34 and memory 35). Alternatively, control unit 29 is external to computing unit 28 (e.g., control unit 29 using a different processor 34 and a different memory 35). Responsive to receiving the cleaning signal and/or the referencing signal (e.g., the processor 34 of the control unit receives the cleaning signal and/or the referencing signal), the self-propelled combine 1, such as the control unit 29 of the combine 1, performs a cleaning of the optical measuring device 7 using the bypass device 6 and/or enables a refer- encing of the optical measuring device 7 by preventing the inflow of the partial flow of harvested material into the optical measuring device 7. For example, the control unit may send command(s) to control and/or configure the bypass device 6, such as by controlling motor to move the piston rod 12, to clean the optical measuring device 7 and/or to prevent the inflow of the partial flow of harvested material into the optical measuring device 7 to reference the optical measuring device 7.

When the optical measuring device 7 transmits a cleaning signal, the piston rod 12 is moved to the end position to effect cleaning of the optical measuring device 7, such as the tube 10 (e.g., control unit sending one or more commands).

Responsive to the optical measuring device 7 transmitting the referencing signal, the piston rod 12 is controlled in such a way that the piston rod 12 is positioned in an intermediate position so that the partial flow of harvested material cannot flow into the tube 10 of the optical measuring device 7. This state is illustrated in FIG. 4.

If the optical measuring device 7 does not transmit a cleaning signal and a referencing signal, the piston rod 12 is controlled in such a way that the piston rod 12 is positioned in an opening position, so that a partial flow of harvested material conveyed by the screw conveyor 8 may substan- tially flow into the feed tube 9 and subsequently flows through the tube 10. In so doing, it may be provided that the screw conveyor 8 starts conveying the partial flow of harvested material when the piston rod 12 has assumed an opening position.

Further, it is intended that the foregoing detailed descrip- tion be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Combine
2 Harvested material
3 Grain elevator
4 Conveying and cleaning device
5 Grain tank
6 Bypass device
7 Optical measuring device
8 Screw conveyor
9 Feed tube
10 Tube
11 Cylinder device
12 Piston rod
13 End face
14 End opening
15 Cleaning element
16 Feed opening
17 Outlet opening
18 Intermediate opening 19 Collecting container
20 Drive
21 Base plate
22 Delivery direction
23 Direction of movement
24 Cutting unit
25 Inclined conveyor
26 Threshing unit
27 Separator
28 Computing unit
29 Control unit
30 Screen
31 First transverse tube
32 Second transverse tube
33 Tube body
34 Processor
35 Memory
36 Inflow opening
37 Light source
38 Sensor
39 Motor
FR Direction of travel
SR Direction of gravity
HR Main conveying direction

The invention claimed is:

1. A self-propelled combine configured to collect and process harvested material, the combine comprising:
   a grain elevator configured to convey a flow of harvested material from a conveying and cleaning device of the combine to a grain tank of the combine;
   a bypass device positioned at or relative to the grain elevator and comprising a screw conveyor configured to guide a partial flow of the harvested material that comprises at least a part of the flow of harvested material conveyed through the grain elevator;
   wherein the bypass device includes an optical measuring device configured to determine one or more harvested material properties of the partial flow of harvested material;
   wherein the optical measuring device includes a tube through which the partial flow is guided in order to determine the one or more harvested material properties of the partial flow of harvested material; and
   wherein the bypass device includes a cylinder device with a movable piston rod that is configured to clean the tube of the optical measuring device in order to remove at least some of the harvested material within the tube.

2. The combine of claim 1, wherein the one or more harvested material properties comprises one or more constituents of the partial flow of harvested material.

3. The combine of claim 1, wherein the bypass device has a feed tube configured to guide the partial flow of harvested material from the screw conveyor to the optical measuring device;
   wherein the movable piston rod is controlled to be in one or more of:
      an end face of the movable piston rod is at at least one opening position in which the screw conveyor, the feed tube, and the tube are connected, for purposes of harvested material flow, to each other in order to guide the partial flow of harvested material in such a way that the partial flow of harvested material conveyed by the screw conveyor at least partly flows into the feed tube and subsequently flows through the tube;
      the end face of the movable piston rod is at an intermediate position in which the movable piston rod suppresses the partial flow of harvested material from the screw conveyor to the tube so that at least a part of the partial flow of harvested material originating from the screw conveyor does not flow into the tube of the optical measuring device; or
      the end face of the movable piston rod is at at least one end position in which at least a part of the movable piston rod is positioned in an end opening of the tube of the optical measuring device.

4. The combine of claim 3, wherein the bypass device includes a displacement measuring device configured to determine a position of at least a part of the movable piston rod; and
   wherein the bypass device includes at least one controller configured to position the movable piston rod dependent on the determined position of the at least a part of the movable piston rod.

5. The combine of claim 4, wherein the bypass device includes a brush-like cleaning element configured to clean the movable piston rod;
   wherein the displacement measuring device is configured to determine the position of one or both of the end face or the cleaning element;
   wherein the at least one controller is configured to position the movable piston rod dependent on the determined position of the one or both of the end face or the cleaning element;
   wherein the bypass device includes one or both of a sensor or a switch in the feed tube configured to detect the one or both of the end face or the cleaning element in order to determine the position of one or both of the end face or the cleaning element.

6. The combine of claim 3, wherein the bypass device includes at least one device configured for time-controlled position change of one or both of the end face or a cleaning element of the movable piston rod.

7. The combine of claim 3,
   wherein the optical measuring device is configured to determine the position of one or both of the end face or a cleaning element within the tube; and
   wherein the bypass device includes at least one controller configured to position at least a part of the movable piston rod dependent on the determined position of the one or both of the end face or the cleaning element.

8. The combine of claim 7, wherein the optical measuring device includes at least one device to sense at least one absorption spectrum; and
   wherein the optical measuring device is configured to determine the position of the one or both of the end face or the cleaning element based on the at least one absorption spectrum.

9. The combine of claim 7, wherein the one or both of the end face or the cleaning element has a geometric variation at one or more sections; and
   wherein the one or both of the end face or the cleaning element is formed at least sectionally from different materials.

10. The combine of claim 1, wherein the bypass device includes one or more of:
   a feed opening through which the partial flow of harvested material from the grain elevator is configured to flow into the bypass device;
   an outlet opening through which the partial flow of harvested material is configured to flow into the grain elevator after flowing through the optical measuring device; or an intermediate opening through which the partial flow of harvested material is configured to flow into the grain elevator; and further comprising a collecting container configured to collect at least a part of the partial flow of harvested material, the collecting container being formed between the feed opening and the screw conveyor.

11. A method for performing one or both of cleaning or referencing an optical measuring device of a self-propelled combine, the method comprising:

operating the combine, the combine:

comprising a grain elevator configured to convey a flow of harvested material from a conveying and cleaning device of the combine to a grain tank of the combine; and a bypass device positioned at or relative to the grain elevator and comprising a screw conveyor configured to guide a partial flow of the harvested material that comprises at least a part of the flow of harvested material conveyed through the grain elevator, wherein the bypass device includes the optical measuring device configured to determine one or more harvested material properties of the partial flow of harvested material, wherein the optical measuring device includes a tube through which the partial flow is guided in order to determine the one or more harvested material properties of the partial flow of harvested material, and wherein the bypass device includes a cylinder device with a movable piston rod that is configured to clean the tube of the optical measuring device in order to remove at least some of the harvested material within the tube;

determining, by the optical measuring device, whether to perform one or both of cleaning or referencing; and transmitting, by the optical measuring device, one or both of a cleaning signal or a referencing signal to at least a part of the combine responsive to determining to perform the one or both of cleaning or references; and responsive to detecting, by the at least a part of the combine, the one or both of the cleaning signal or the referencing signal, performing one or both of:

cleaning of the optical measuring device using the bypass device by moving the movable piston rod in order to remove at least some of the harvested material within the tube; or configuring at least a part of the combine in order to prevent inflow of the partial flow of harvested material into the optical measuring device and performing, at least partly while the inflow of the partial flow of the harvested material is prevented, at least one operation to reference the optical measuring device.

12. The method of claim 11, wherein the self-propelled combine, after detecting the cleaning signal, controls the movable piston rod so that the movable piston rod moves into an end position in order to effect cleaning of the tube of the optical measuring device.

13. The method of claim 11, wherein the self-propelled combine, after detecting the referencing signal, controls the movable piston rod to be positioned in an intermediate position so that the partial flow of harvested material cannot flow into the tube of the optical measuring device.

14. The combine of claim 1, wherein the movable piston rod is not aligned perpendicularly to a conveying direction of the screw conveyor.

15. The combine of claim 1, wherein the screw conveyor is controlled so that the movable piston rod, in cleaning the tube of the optical measuring device, is moved without friction of at least a part of the screw conveyor.

16. The combine of claim 1, wherein the optical measuring device is configured to determine whether to clean the tube of the optical measuring device.

17. The combine of claim 16, further comprising a control unit;

wherein, responsive to the optical measuring device determining to clean the tube of the optical measuring device, the optical measuring device is configured to transmit at least one signal to the control unit of the combine; and responsive to receiving the at least one signal, the control unit is configured to control the movable piston rod in order to clean the tube of the optical measuring device.

18. The method of claim 11, wherein the optical measuring device determines whether to clean the tube of the optical measuring device.

19. The method of claim 18, further comprising:

responsive to the optical measuring device determining to clean the tube of the optical measuring device, the optical measuring device transmits at least one signal to a control unit of the combine; and responsive to receiving the at least one signal, the control unit controls the movable piston rod in order to clean the tube of the optical measuring device.

* * * * *